No. 793,708.

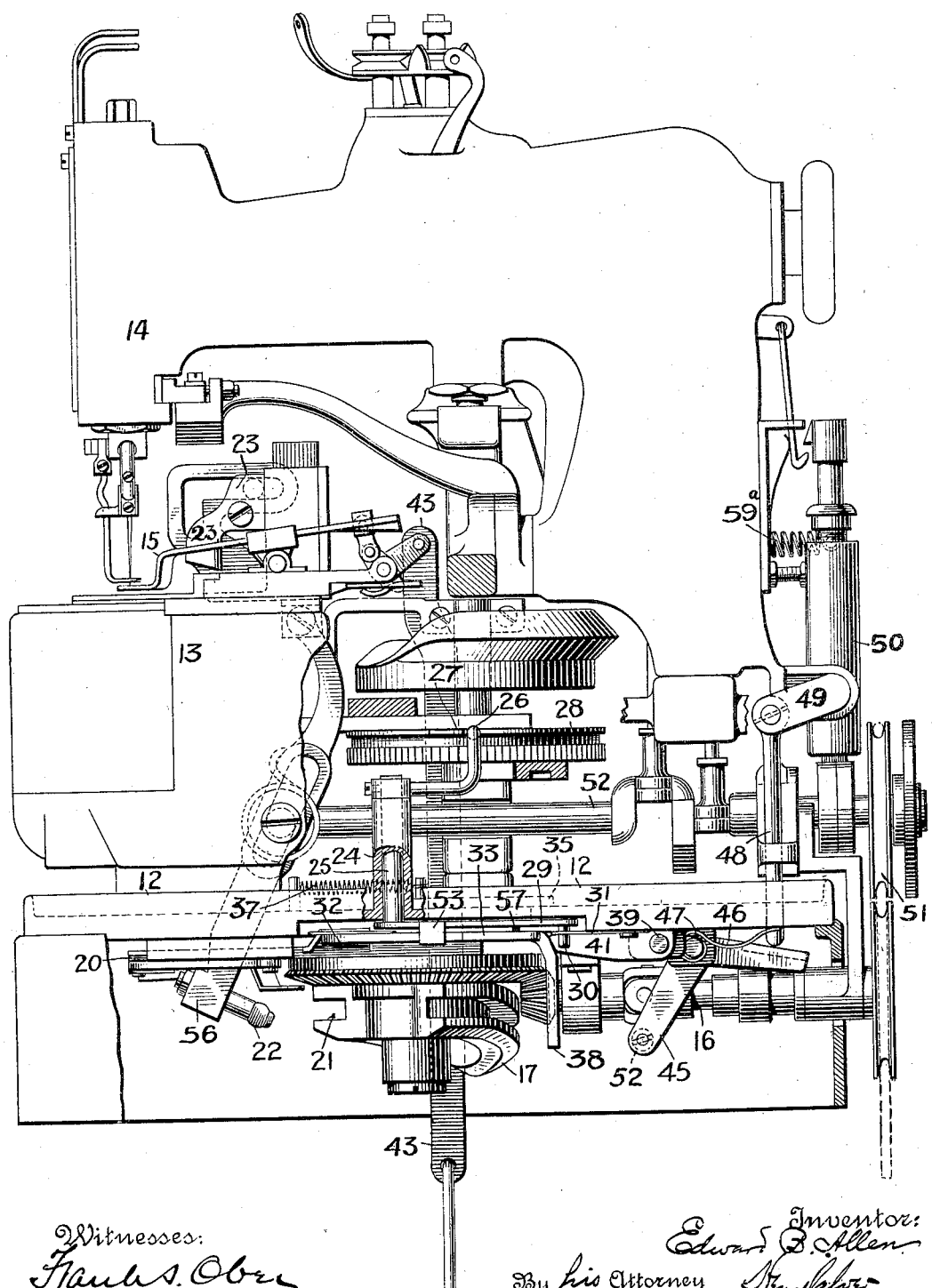

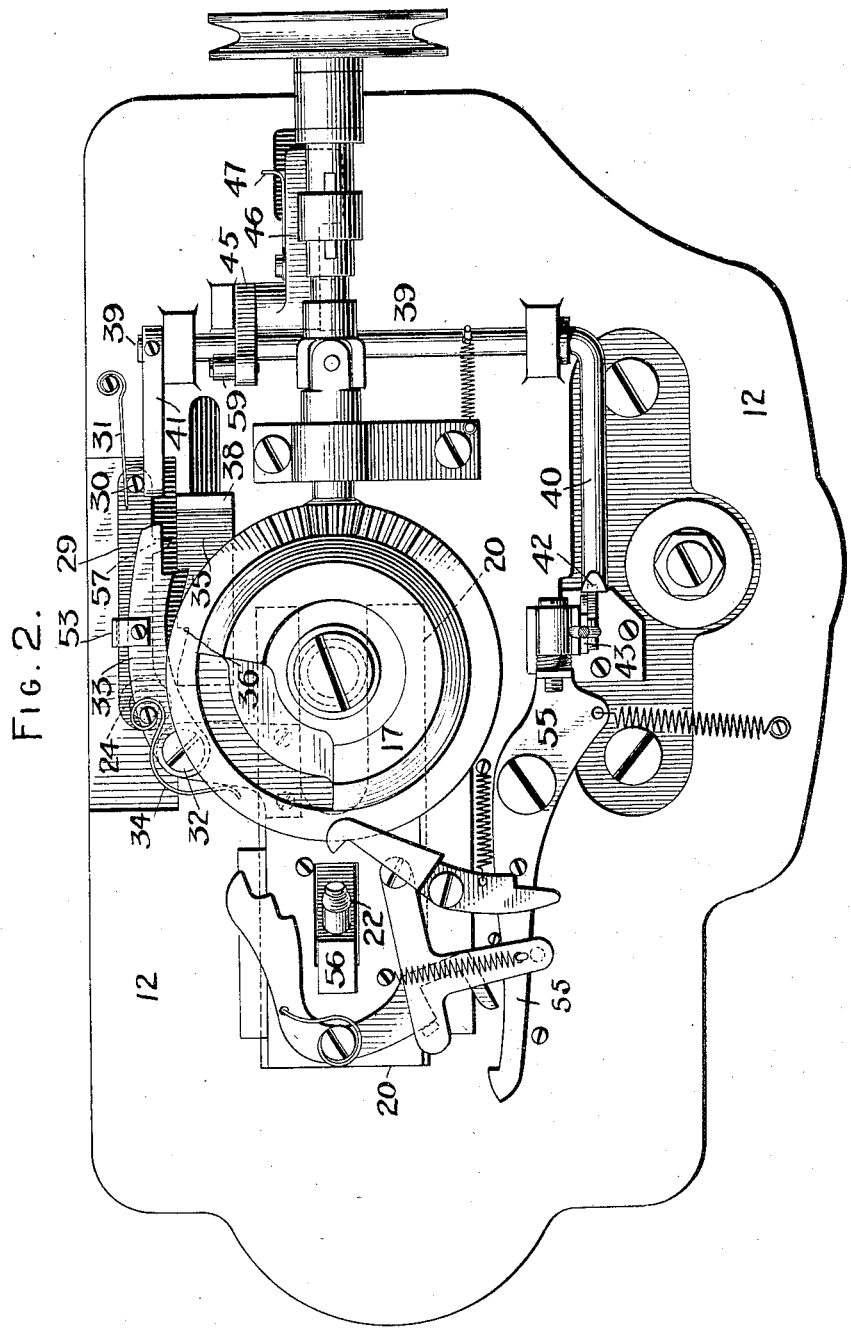

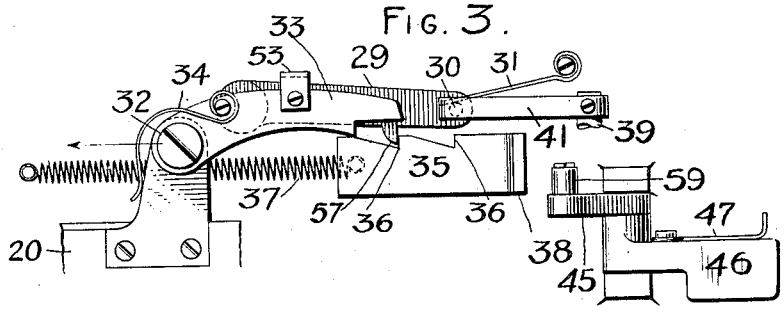
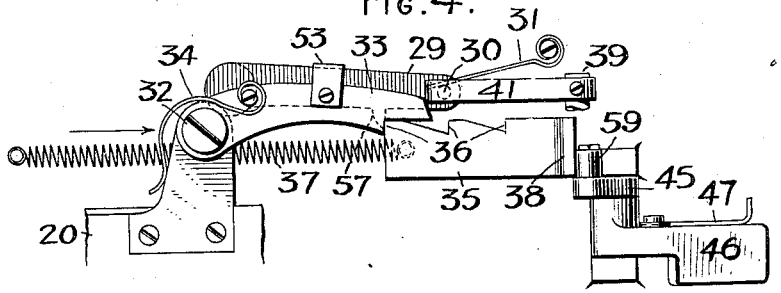
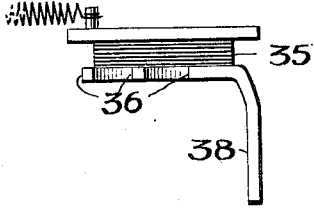
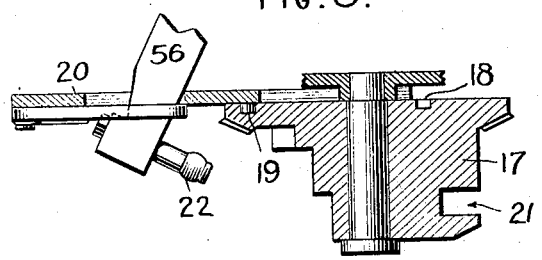
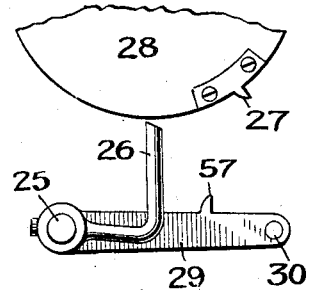

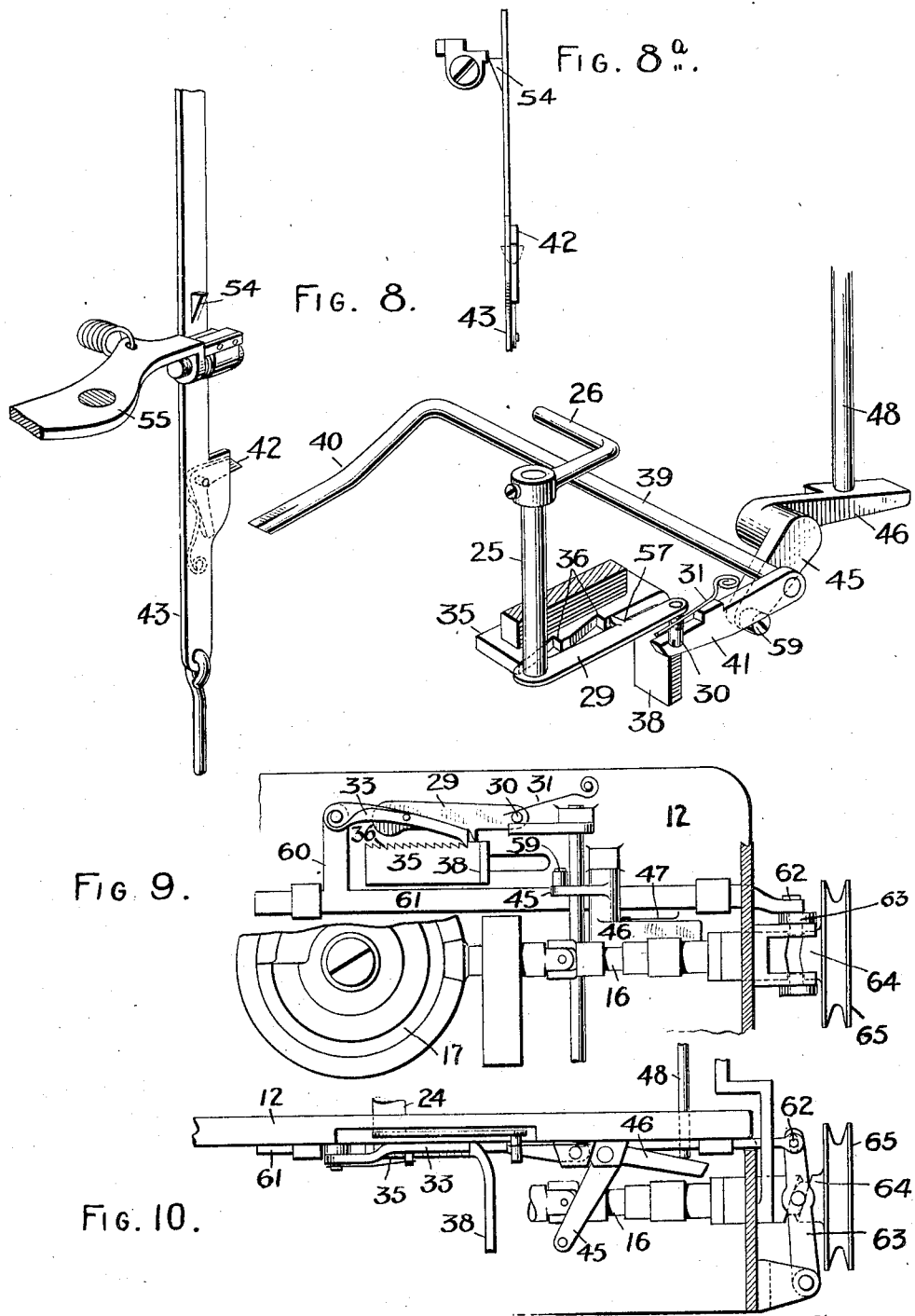

Patented July 4, 1905.

UNITED STATES PATENT OFFICE.

EDWARD B. ALLEN, OF ELIZABETH, NEW JERSEY, ASSIGNOR TO THE SINGER MANUFACTURING COMPANY, A CORPORATION OF NEW JERSEY.

BUTTONHOLE CUTTING AND STITCHING MACHINE.

SPECIFICATION forming part of Letters Patent No. 793,708, dated July 4, 1905.

Application filed November 25, 1904. Serial No. 234,199.

*To all whom it may concern:*

Be it known that I, EDWARD B. ALLEN, a citizen of the United States, residing at Elizabeth, in the county of Union and State of New Jersey, have invented certain new and useful Improvements in Buttonhole Cutting and Stitching Machines, of which the following is a specification, reference being had therein to the accompanying drawings.

This invention relates to that class of buttonhole cutting and stitching machines in which the buttonhole-slits are cut prior to the stitching operations; and the invention has for its object to provide a comparatively simple mechanism by which at a predetermined time subsequent to a manually-started buttonhole-cutting operation the stitch-forming mechanism of the machine will be automatically set into action to stitch a buttonhole.

To effect this result, the invention comprises a tripping mechanism which controls the start and stop motion device for the stitching mechanism, and which tripping mechanism is set in readiness to be automatically tripped when a treadle-rod or other controlling device actuated by the attendant is moved to couple the buttonhole-cutting device with its continuously-running operating mechanism, said tripping mechanism at a desired predetermined period subsequent to a buttonhole-cutting operation being automatically caused to act on the start and stop motion device to set the stitching mechanism into operation.

In the accompanying drawings, Figure 1 is a side view, partly in vertical section, of a buttonhole cutting and stitching machine embodying the present invention. Fig. 2 is a bottom view of the same. Figs. 3 and 4 are detail views with the parts in different positions, showing the automatic mechanism for releasing the tripping device for the start-motion device of the stitching mechanism; and Fig. 5 shows the slide-plate forming a part of said automatic mechanism. Fig. 6 is a detail sectional view of part of the cutting mechanism. Fig. 7 is a detail view of part of the stopping mechanism. Fig. 8 is a detail perspective view of part of the stopping and starting mechanism, and Fig. 8$^a$ a detail side view of part of the treadle-rod. Figs. 9 and 10 are partial side and bottom views of a machine embodying a modified form of the invention.

The machine shown is, as to its general structure and as to the construction and operation of its stitching mechanism, essentially the same as the machine fully shown and described in United States Patent No. 734,794, granted July 28, 1903, but comprises a work-clamp like that of United States Patent No. 736,471, granted August 18, 1903, and a buttonhole-cutting device and an operating mechanism therefor like that of United States Patent No. 758,037, granted April 26, 1904, to which patents reference may be had for a full understanding of such features as it is not necessary to describe in detail herein. This machine comprises a stationary base or bed plate 12, rigid with which is a work-support 13, a traveling stitching-frame 14, carrying stitch-forming devices, which are mounted for periodical rotation for stitching eyed buttonholes, and a work-clamp 15, which is fixed to said work-support. Beneath the bed-plate 12 is the continuously-running shaft 16, geared to the cam-wheel 17, the latter having in its upper face a cam-groove 18, entered by a pin 19 on a continuously-reciprocating slide 20, to which a cutter-operating pitman-lever 56 is coupled at proper times, said cam-wheel or cam device comprising also a grooved peripheral cam 21 to be entered by a roller-stud 22 on the said pitman-lever when the buttonhole-cutter 23, carried by said pitman-lever, is to be operated to cut a buttonhole-slit, all as in the machine of said Patent No. 758,037, but to which has been added a controlling and tripping mechanism for the start and stop motion device for the stitching mechanism and which will now be described.

Fixed to the bed-plate 12 is a sleeve or hollow standard 24, in which is journaled a small vertical rock-shaft 25, having at its upper end an arm 26 to be engaged by a tripping-lug 27 on the feed-wheel 28 when the stitching of a buttonhole has been completed and the action of the stitch forming and feeding mechanism of the machine is to be stopped, said shaft 25 having at its lower end beneath the bed-plate 12 a second arm 29, provided with a pin 30, against which bears a spring 31, the stress of which presses both of said arms 26 and 29 yieldingly inward. Pivotally attached at 32 to the continuously-reciprocating slide 20 or to a lug or ear thereon is a push-pawl 33, pressed inward by a spring 34. Mounted in the bed-plate 12 is a slide-plate 35, provided with a series of teeth or shoulders 36 to be engaged by the pawl 33, said slide-plate being normally drawn forward by a spring 37 and being provided with a depending arm 38.

Beneath the bed-plate 12 is a transverse rock-shaft 39, having arms 40 and 41, the arm 40 being arranged to be engaged by the lower face of a pivoted tripping-dog 42 on the treadle-operated controlling rod or bar 43 and which when depressed closes the work-clamp 15. The arm 41 of the rock-shaft 39 is so located relative to the pin 30 on the arm 29 that when said arm is depressed the said pin will be forced by the spring 31 above the said arm 41 to serve as a stop to hold both of the arms 40 and 41 depressed against the yielding stress of the spring 44, connected with the shaft 39, so as to have a tendency to lift said arms.

Mounted beneath the bed-plate 12 is an elbow-lever or rocker comprising the depending arm 45 and the approximately horizontal arm 46, rigid with the said arm 45 and pressed against by the spring 47. Above the arm 46 of the said elbow-lever or rocker is a rod 48, jointed at its upper end to a rigid arm 49, with which the start and stop motion lever 50 is provided, so that when the said rod 48 is lifted the said lever will be moved to permit the loose driving-pulley 51 to be coupled to the stitching-mechanism driving-shaft 52 of the machine through a suitable clutch device (which is or may be the same as that shown in the patents hereinbefore mentioned and the operation of which is fully set forth in United States Patent granted April 30, 1901, No. 673,353) to set the stitch forming and feeding mechanisms of the machine into action.

The operation of the invention is as follows, beginning with the stopped position of the machine shown in Figs. 1 and 2: When the work has been adjusted, the attendant depresses the rod 43 to close the spring-opened work-clamp 15, and at the downward movement of the said rod 43 the dog 42 engages the arm 40 of the rock-shaft 39 and moves the other arm 41 of said rock-shaft far enough downward so that the stop-pin 30 on the arm 29 of the vertical rock-shaft 25 can fall inward above the said arm 41, thus setting the upper arm 26 of said shaft 25 in position to be engaged by the tripping-lug 27 on the feed-wheel. In the outer position of the arm 29 the pawl 33, continuously reciprocating with the slide 20, was held out of engagement with the shoulders 36 of slide-plate 35 by the lug-lip 53 on said pawl and which overlaps the said arm 29; but when the arm 41 is depressed, as just stated, the stop-pin 30, previously impinging against the side of said arm 41, moves inward and the corresponding movement of the arm 29 permits the pawl 33 also to move inward to engage the teeth or shoulders 36 of the slide-plate 35. The downward movement of the treadle-rod 43 also causes the inclined lug 54 on said rod to engage the rear end of the tripping-lever 55 to couple the continuously-reciprocating slide 20 with the pitman-lever 56 to move the cutter 23 forward to cutting position and to couple said pitman-lever with the operating grooved cam 21, and the buttonhole-cutting operation is then performed, the cutter restored to its non-operative position, and the pitman-lever is uncoupled from its operating-cam and the slide 20, all as fully set forth in Patent No. 758,037, hereinbefore referred to. In the meantime the slide-plate 35 is advanced to the extent of one shoulder or tooth thereon at each reciprocation of the push-pawl 33 with the slide 20 and is retained in each advanced position by a retaining lug or detent 57 on the arm 29 and which lug or detent falls behind a shoulder of said slide-plate before the push-pawl is retracted. In the present instance the said slide-plate is shown as being provided with three shoulders 36, including the shoulder afforded by its end; but a greater number of such shoulders might be provided, if desired, to insure a proper time after a buttonhole-cutting operation for the removal of the cutter out of the way and the uncoupling of the cutter-lever from its actuating-cam and slide before the stitch-forming mechanism is automatically set in operation by the engagement of the depending arm 38 of the slide-plate 35 with the arm 45 of the elbow-lever or rocker (or with a roller 59 on said arm 45) to lift the arm 46 of the rocker, and thus through the rod 48 to cause the start and stop motion lever 50 to be operated to set the stitching mechanism into action.

From the foregoing it will be apparent that the invention comprises means whereby on the depression of a treadle-rod or other manually-operated device the work-clamp is closed, a buttonhole-cutting device is coupled to its operating mechanism, and a tripping mechanism is started, so that after a predetermined period subsequent to the coupling of the cutting device with its operating mechanism and to afford ample time for the cutting operation and the removal of the cutting devices out of the way of the stitching devices the stitching mechanism is automatically set into operation by the automatic tripping of the start and stop motion lever. When the stitching of a buttonhole has been completed, the machine is automatically stopped by the engagement of the tripping-lug 27 on the feed-wheel 28 with the arm 26 of the rock-shaft 25, so as to move the lower arm 29 on said shaft far enough to withdraw the retaining lug or detent 57 on said arm from engagement with a shoulder of the slide-plate 35, thus leaving said slide-plate free to be retracted by its spring 37, and thereby releasing the arm 38 of said slide-plate from the arm 40 of the elbow-lever or rocker, which through the rod 48 holds the start and stop motion lever 50 in the running position of the machine against the stress of the retracting-spring 59ᵃ of the said lever 50, such outward movement of the arm 29 also moving the reciprocating push-pawl 33 out of range of the shoulders 36 of the slide-plate 35.

Instead of operating the pawl 33 from the slide 20, as above described, said pawl may be carried by an arm 60 on a sliding bar 61, moving in a suitable way on the bed-plate 12 and having at its rear end a roller-stud 62, engaged by the forked end of a lever 63, operated from a cam 64, rotating with the pulley 65 on the driving-shaft of the machine, and in thus operating the said pawl 33 the sliding plate 35 will have more closely-placed teeth or shoulders 36 than in the form of the invention first described.  (See Figs. 9 and 10.)

The term "manually" as herein employed in connection with the treadle device or rod which closes the work-clamp, starts the cutting mechanism into operation, and releases the tripping mechanism is intended to refer to any non-automatic device operated by the hand or foot of the attendant for performing the functions just indicated.

Having thus described my invention, I claim and desire to secure by Letters Patent—

1. In a buttonhole cutting and stitching machine, the combination with a stitching mechanism and a buttonhole-cutting device, of a continuously-operating cutter-actuating mechanism, a starting device for the said stitching mechanism, an automatic tripping mechanism for said starting device, manually-operated controlling means for coupling said cutting device to its actuating mechanism to set said cutting device into action and for releasing said tripping mechanism; so that on the actuation of manually-controlled means a buttonhole-slit will be cut, and, at a predetermined period subsequent to the cutting operation, the said stitching mechanism will be automatically started by said tripping mechanism.

2. In a buttonhole cutting and stitching machine, the combination with a work-clamp, a buttonhole-cutting device, a stitching mechanism, and a starting device for said stitching mechanism, of an automatic tripping mechanism for the said starting device, and a manually-operated controlling device by which the said work-clamp is closed, the cutting device set into action and the automatic tripping mechanism started to set the stitching-starting device into operation at a predetermined time subsequent to the cutting operation.

3. In a buttonhole cutting and stitching machine, the combination with a buttonhole-cutting device, a stitching mechanism and a starting device for said stitching mechanism, of an automatic tripping device by which the said starting device is tripped to set the stitching mechanism into action, a manually-operated controlling device for the said cutting and tripping devices, and variable automatic means whereby, after a predetermined period subsequent to the operation of the cutting device, the said tripping device will be caused to act on the said starting device to set the said stitching mechanism into operation.

4. In a buttonhole cutting and stitching machine, the combination with a work-clamp, a buttonhole-cutting device, a stitching mechanism and a starting device for said stitching mechanism, of a tripping device by which the said starting device is tripped to set the stitching mechanism into action, a manually-operated controlling device for the said cutting and tripping devices, and for closing said work-clamp, and automatic means whereby, after a predetermined period subsequent to the closing of the said work-clamp and the operation of the cutting device, the said tripping device will be caused to act on the said starting device to set the said stitching mechanism into operation.

5. In a buttonhole cutting and stitching machine, the combination with a buttonhole-cutting device, a stitching mechanism and a starting device for said stitching mechanism, of a tripping device by which the said starting device is tripped to set the stitching mechanism into action, a manually-operated controlling device for the said cutting and tripping devices, and automatic means comprising an intermittingly-moving part, as slide-plate 35, whereby, after a predetermined period subsequent to the operation of the cutting device, the said tripping device will be caused to act on the said starting device to set the said stitching mechanism into operation.

6. In a buttonhole cutting and stitching machine, the combination with a work-clamp, a buttonhole-cutting device, a stitching mechanism and a starting device for said stitching mechanism, of a tripping device by which the said starting device is tripped to set the stitching mechanism into action, a manually-operated controlling device for the said cutting and tripping devices, and for closing said work-clamp, and automatic means comprising an intermittingly-moving part, as slide-plate 35, whereby, after a predetermined period subsequent to the closing of the said work-clamp and the operation of the cutting device, the said tripping device will be caused to act on the said starting device to set the said stitching mechanism into operation.

In testimony whereof I affix my signature in presence of two witnesses.

EDWARD B. ALLEN.

Witnesses:
HENRY J. MILLER,
H. A. KORNEMANN.